US012709674B2

(12) United States Patent
Nukui

(10) Patent No.: US 12,709,674 B2
(45) Date of Patent: Aug. 18, 2026

(54) GLASS-FIBER-REINFORCED RESIN COMPOSITION AND MOLDED GLASS-FIBER-REINFORCED RESIN ARTICLE

(71) Applicant: NITTO BOSEKI CO., LTD., Fukushima (JP)

(72) Inventor: Yosuke Nukui, Fukushima (JP)

(73) Assignee: Nitto Bosekl Co., Ltd., Fukushima (JP)

( * ) Notice: Subject to any disclaimer, the term of this patent is extended or adjusted under 35 U.S.C. 154(b) by 796 days.

(21) Appl. No.: 17/775,751

(22) PCT Filed: Nov. 20, 2020

(86) PCT No.: PCT/JP2020/043410
§ 371 (c)(1),
(2) Date: May 10, 2022

(87) PCT Pub. No.: WO2021/157162
PCT Pub. Date: Aug. 12, 2021

(65) Prior Publication Data

US 2022/0380577 A1 Dec. 1, 2022

(30) Foreign Application Priority Data

Feb. 6, 2020 (JP) ................................ 2020-018524

(51) Int. Cl.
*C08K 7/14* (2006.01)

(52) U.S. Cl.
CPC ...................................... *C08K 7/14* (2013.01)

(58) Field of Classification Search
CPC ........................................................ C08K 7/14
See application file for complete search history.

(56) References Cited

U.S. PATENT DOCUMENTS 10,160,860 B2 12/2018 Koch et al.
2009/0062452 A1 * 3/2009 Harder .................. C08G 69/36 264/165
2010/0227122 A1 * 9/2010 Kumazawa ............. C08L 77/02 524/451
2014/0066560 A1 3/2014 Stoppelmann et al.
2015/0175803 A1 6/2015 Stoppelmann
2016/0102203 A1 * 4/2016 Koch ....................... C08K 7/14 524/538
2020/0079919 A1 3/2020 Tsuchigane et al.
2020/0199015 A1 6/2020 Hosokawa et al.
2022/0112358 A1 4/2022 Nukui et al.

FOREIGN PATENT DOCUMENTS

EP 3006507 A1 4/2016
JP 2014-224162 A 12/2014
JP 2019-195909 A 11/2019
KR 2019-0097091 A 8/2019
KR 2019-0133058 A 11/2019
WO 2014/148641 A1 9/2014
WO 2014/171363 A1 10/2014
WO 2017/171102 A1 10/2017
WO 2019/216443 A2 11/2019

OTHER PUBLICATIONS

The extended European Search Report dated Sep. 26, 2023 issued in the corresponding EP Patent Application No. 20917479.6.
Office Action dated Oct. 16, 2025 issued in the corresponding Korean Patent Application No. 10-2022-7012972 with the English machine translation thereof.

* cited by examiner

*Primary Examiner* — Catherine S Branch
*Assistant Examiner* — Andrea Wu
(74) *Attorney, Agent, or Firm* — Carrier, Shende & Associates P.C.; Joseph P. Carrier; Jeffrey T. Gedeon

(57) ABSTRACT

Provided is a glass fiber-reinforced resin composition that has excellent strength and an excellent modulus when processed into a glass fiber-reinforced resin molded article and has excellent processability on producing a glass fiber-reinforced resin molded article. In the glass fiber-reinforced resin composition, the content of $SiO_2$ S is 48 to 70% by mass and the content of $Al_2O_3$ A is 9 to 30% by mass with respect to the total amount of the glass fiber included therein, the glass fiber comprises a flat cross-sectional shape having a minor axis DS of 6.0 to 15.0 μm and a major axis DL of 20.5 to 50.0 μm, the glass fiber content C in the glass fiber-reinforced resin composition is from 65.0 to 85.0% by mass, and S, A, DS, DL, and C satisfy the following formula (1).

$$2.24 \leq \left(100\times\left(A^2/S\right)\times\left(C/100\right)^8\right)/\left(DS^{3/4}\times DL^{1/4}\right) \leq 5.85 \quad (1)$$

14 Claims, No Drawings

GLASS-FIBER-REINFORCED RESIN COMPOSITION AND MOLDED GLASS-FIBER-REINFORCED RESIN ARTICLE

TECHNICAL FIELD

The present invention relates to a glass fiber-reinforced resin composition and a glass fiber-reinforced resin molded article.

BACKGROUND ART

Recently, attention has been paid to glass fiber-reinforced resin molded articles as metal substitute materials. For extending the range of substitution, a higher level of mechanical strength than before has been required from glass fiber-reinforced resin molded articles.

In order to enhance the mechanical strength of glass fiber-reinforced resin molded articles, a method in which glass fiber, which usually has a circular cross-sectional shape, is cause to have a flat cross-sectional shape, a method in which the fiber diameter of glass fiber is reduced, a method in which glass fiber of a high strength composition having high contents of $SiO_2$ and $Al_2O_3$ is employed, or a method of a combination of these methods have been conventionally attempted (see, e.g., Patent Literature 1 and 2).

CITATION LIST

Patent Literature

Patent Literature 1: International Publication WO No. 2019/216443

Patent Literature 2: International Publication WO No. 2017/171102

SUMMARY OF INVENTION

Technical Problem

According to the attempt described above, although the strength of glass fiber-reinforced resin molded articles are enhanced, there is a problem in that the modulus is insufficiently enhanced. In order to solve the problem and to enhance the modulus, it is contemplated that the glass fiber content in the glass fiber-reinforced resin molded articles is enhanced.

However, when the glass fiber content in the glass fiber-reinforced resin molded article is enhanced, there is a disadvantage in that the processability on producing a glass fiber-reinforced resin molded article is degraded and thus production of the glass fiber-reinforced resin molded article will be difficult.

In view of overcoming the disadvantage, it is an object of the present invention to provide a glass fiber-reinforced resin composition that has excellent strength and an excellent modulus when processed into a glass fiber-reinforced resin molded article and has excellent processability on producing a glass fiber-reinforced resin molded article, and a glass fiber-reinforced resin molded article using the same.

Solution to Problem

In order to achieve the object, the present invention is a glass fiber-reinforced resin composition, wherein, in glass fiber included in the glass fiber-reinforced resin composition, the content of $SiO_2$S with respect to the total amount of the glass fiber is in the range of 48 to 70% by mass, in the glass fiber included in the glass fiber-reinforced resin composition, the content of $Al_2O_3$ A with respect to the total amount of the glass fiber is in the range of 9 to 30% by mass, the glass fiber comprises a flat cross-sectional shape having a minor axis DS in the range of 6.0 to 15.0 μm and a major axis DL in the range of 20.5 to 50.0 μm, the glass fiber content C in the glass fiber-reinforced resin composition is in the range of 65.0 to 85.0% by mass, and the S, A, DS, DL, and C satisfy following formula (1).

$$2.24 \le \left(100\times\left(A^2/S\right)\times\left(C/100\right)^8\right)/\left(DS^{3/4}\times DL^{1/4}\right) \le 5.85 \quad (1)$$

According to the glass fiber-reinforced resin composition of the present invention, when the S, A, DS, DL, and C are in the range described above and satisfy the conditions of the formula (1), excellent strength and an excellent modulus can be provided when the composition is processed into a glass fiber-reinforced resin molded article, and excellent processability can be provided on producing a glass fiber-reinforced resin molded article. "Comprises excellent strength" herein means that the bending strength of the glass fiber-reinforced resin molded article is 325 MPa or more. "Comprises an excellent modulus" means that the modulus of the glass fiber-reinforced resin molded article is 25 GPa or more.

In order that the glass fiber-reinforced resin composition of the present invention can provide excellent strength and an excellent modulus when processed into a glass fiber-reinforced resin molded article and can provide particularly excellent processability on producing a glass fiber-reinforced resin molded article, it is preferred that the S be in the range of 50 to 60% by mass, the A be in the range of 10 to 20% by mass, the DS be in the range of 7.5 to 13.0 μm, the DL be in the range of 30.5 to 48.0 μm, the C be in the range of 70.5 to 82.5% by mass, and the S, A, DS, DL, and C satisfy the following formula (2).

$$2.27 \le \left(100\times\left(A^2/S\right)\times\left(C/100\right)^8\right)/\left(DS^{3/4}\times DL^{1/4}\right) \le 4.30 \quad (2)$$

In order that the glass fiber-reinforced resin composition of the present invention can provide particularly excellent strength and an excellent modulus when processed into a glass fiber-reinforced resin molded article, can provide particularly excellent processability on producing a glass fiber-reinforced resin molded article, and further can provide excellent impact resistance, it is more preferred that the S be in the range of 50 to 60% by mass, the A be in the range of 10 to 20% by mass, the DS be in the range of 7.5 to 13.0 μm, the DL be in the range of 30.5 to 48.0 μm, the C be in the range of 70.5 to 82.5% by mass, and the S, A, DS, DL, and C satisfy the following formula (3). "Comprises particularly excellent strength" herein means that the bending strength of the glass fiber-reinforced resin molded article is 340 MPa or more. "Comprises excellent impact resistance" means that the Charpy impact strength of the glass fiber-reinforced resin molded article is 25 kJ/$m^2$ or more.

$$2.29 \le \left(100\times\left(A^2/S\right)\times\left(C/100\right)^8\right)/\left(DS^{3/4}\times DL^{1/4}\right) \le 3.37 \quad (3)$$

In the glass fiber-reinforced resin composition of the present invention, the resin included in the glass fiber-reinforced resin composition may be either a thermoplastic resin or a thermosetting resin, is preferably a thermoplastic resin for injection molding selected from the group consisting of polyamide resins, polybutylene terephthalate resins, polycarbonate resins, polyarylene sulfide resins, polyaryl ketone resins, and liquid crystal polymer (LCP), and is more preferably a polyamide resin.

In the glass fiber-reinforced resin composition of the present invention, use of the thermoplastic resin for injection molding enables large glass fiber-reinforced resin molded articles to be produced efficiently. Particularly, polyamide resins, which have an excellent balance between strength and heat resistance, are suitable as metal substitute materials for automotive bodies and provide a large effect of improving production efficiency by use of the glass fiber-reinforced resin composition of the present invention.

The glass fiber-reinforced resin molded article of the present invention is formed from the above-described glass fiber-reinforced resin composition of the present invention.

DESCRIPTION OF EMBODIMENTS

Hereinafter, embodiments of the present invention will be described in detail.

In the glass fiber-reinforced resin composition of the present embodiment, in the glass fiber included in the glass fiber-reinforced resin composition, the content of $SiO_2$S with respect to the total amount of the glass fiber is in the range of 48 to 70% by mass, in the glass fiber included in the glass fiber-reinforced resin composition, the content of $Al_2O_3$ A with respect to the total amount of the glass fiber is in the range of 9 to 30% by mass, the glass fiber comprises a flat cross-sectional shape having a minor axis DS in the range of 6.0 to 15.0 μm and a major axis DL in the range of 20.5 to 50.0 μm, the glass fiber content C in the glass fiber-reinforced resin composition is in the range of 65.0 to 85.0% by mass, and the S, A, DS, DL, and C satisfy following formula (1).

$$2.24 \leq \left(100 \times \left(A^2/S\right) \times \left(C/100\right)^8\right)/\left(DS^{3/4} \times DL^{1/4}\right) \leq 5.85 \quad (1)$$

According to the glass fiber-reinforced resin composition of the present embodiment, when the S, A, DS, DL, and C are in the range described above and satisfy the conditions of the formula (1), excellent strength and an excellent modulus can be provided when the composition is processed into a glass fiber-reinforced resin molded article, and excellent processability can be provided on producing a glass fiber-reinforced resin molded article. "Comprises excellent strength" herein means that the bending strength of the glass fiber-reinforced resin molded article is 325 MPa or more. "Comprises an excellent modulus" means that the modulus of the glass fiber-reinforced resin molded article is 25 GPa or more.

In order that excellent strength and an excellent modulus when the composition is processed into a glass fiber-reinforced resin molded article can be more certainly provided and excellent processability can be more certainly provided on producing a glass fiber-reinforced resin molded article, it is preferred that the S be in the range of 48 to 70% by mass, the A be in the range of 9 to 30% by mass, the DS be in the range of 6.0 to 15.0 μm, the major axis DL be in the range of 20.5 to 50.0 μm, the C be in the range of 65.0 to 85.0% by mass, and the S, A, DS, DL, and C satisfy the following formula (4).

$$2.25 \leq \left(100 \times \left(A^2/S\right) \times \left(C/100\right)^8\right)/\left(DS^{3/4} \times DL^{1/4}\right) \leq 4.90 \quad (4)$$

In order that the glass fiber-reinforced resin composition of the present embodiment can provide excellent strength and an excellent modulus when processed into a glass fiber-reinforced resin molded article and can provide particularly excellent processability on producing a glass fiber-reinforced resin molded article, it is preferred that the S be in the range of 50 to 60% by mass, the A be in the range of 10 to 20% by mass, the DS be in the range of 7.5 to 13.0 μm, the DL be in the range of 30.5 to 48.0 μm, the C be in the range of 70.5 to 82.5% by mass, and the S, A, DS, DL, and C satisfy the following formula (2).

$$2.27 \leq \left(100 \times \left(A^2/S\right) \times \left(C/100\right)^8\right)/\left(DS^{3/4} \times DL^{1/4}\right) \leq 4.30 \quad (2)$$

In order that the glass fiber-reinforced resin composition of the present embodiment can provide particularly excellent strength and an excellent modulus when processed into a glass fiber-reinforced resin molded article, can provide particularly excellent processability on producing a glass fiber-reinforced resin molded article, and further can provide excellent impact resistance, it is further preferred that the S be in the range of 50 to 60% by mass, the A be in the range of 10 to 20% by mass, the DS be in the range of 7.5 to 13.0 μm, the DL be in the range of 30.5 to 48.0 μm, the C be in the range of 70.5 to 82.5% by mass, and the S, A, DS, DL, and C satisfy the following formula (3). "Comprises particularly excellent strength" herein means that the bending strength of the glass fiber-reinforced resin molded article is 340 MPa or more. "Comprises excellent impact resistance" means that the Charpy impact strength of the glass fiber-reinforced resin molded article is 25 kJ/$m^2$ or more.

$$2.29 \leq \left(100 \times \left(A^2/S\right) \times \left(C/100\right)^8\right)/\left(DS^{3/4} \times DL^{1/4}\right) \leq 3.37 \quad (3)$$

In order that the glass fiber-reinforced resin composition of the present embodiment can more certainly provide particularly excellent strength and an excellent modulus when processed into a glass fiber-reinforced resin molded article, can more certainly provide particularly excellent processability on producing a glass fiber-reinforced resin molded article, and further can more certainly provide excellent impact resistance, it is particularly preferred that the S, A, DS, DL, and C satisfy the following formula (5).

$$2.30 \leq \left(100 \times \left(A^2/S\right) \times \left(C/100\right)^8\right)/\left(DS^{3/4} \times DL^{1/4}\right) \leq 2.95 \quad (5)$$

In the present invention, the bending strength, the modulus, and the Charpy impact strength each can be measured by the following methods. Apparatuses for use in measurement are not particularly limited as long as having performance equivalent to that of the apparatuses described below.

[Bending Strength]

An A-type dumbbell test piece (thickness: 4 mm) in compliance with JIS K 7165:2008 was subjected to a static tensile test in compliance with JIS K 7171:2016 under a condition of test temperature of 23° C. using a precision universal tester (manufactured by Shimadzu Corporation, trade name: Autograph AG-5000B) to measure the bending strength.

[Flexural Modulus]

The flexural modulus is measured in compliance with JIS K 7017:1999 (Method A, Class III test piece) with a precision universal tester (manufactured by Shimadzu Corporation, trade name: Autograph AG-5000B).

[Charpy Impact Strength]

The test piece is subjected to an unnotched Charpy impact test in compliance with ISO 179-1 under a condition of test temperature of 23° C. using a digital impact tester (manufactured by Toyo Seiki Seisaku-sho, Ltd., model designation: DG-UB type) to measure the unnotched Charpy impact strength, which is taken as the Charpy impact strength.

In the glass fiber-reinforced resin composition of the present embodiment, when the minor axis DS of the glass fiber is less than 6.0 μm, on producing thermoplastic resin pellets containing the glass fiber-reinforced resin composition, glass filaments constituting the glass fiber are more likely to be broken, and thermoplastic resin pellets may not be efficiently produced. In contrast, in the glass fiber-reinforced resin composition of the present embodiment, when minor axis DS of the glass fiber is more than 15.0 μm, the surface area of the glass fiber becomes smaller in a glass fiber-reinforced resin molded article processed from the glass fiber-reinforced resin composition of the present embodiment, and thus the glass fiber-reinforced resin molded article may not have sufficient mechanical strength.

In the glass fiber-reinforced resin composition of the present embodiment, when the major axis DL of the glass fiber is less than 20.5 μm, on producing thermoplastic resin pellets containing the glass fiber-reinforced resin composition, glass filaments constituting the glass fiber are more likely to be broken, and thermoplastic resin pellets may not be efficiently produced. In contrast, in the glass fiber-reinforced resin composition of the present embodiment, when major axis DL of the glass fiber is more than 50.0 μm, the surface area of the glass fiber becomes smaller in a glass fiber-reinforced resin molded article processed from the glass fiber-reinforced resin composition of the present embodiment, and thus the glass fiber-reinforced resin molded article may not have sufficient mechanical strength.

In the glass fiber-reinforced resin composition of the present embodiment, from the viewpoint that fluidity on injection molding is ensured, the minor axis DS of the glass fiber is preferably in the range of 7.5 to 13.0 μm, more preferably in the range of 8.0 to 12.0 μm, and further preferably in the range of 8.5 to 11.5 μm. From the similar viewpoint, the major axis DL of the glass fiber is preferably in the range of 30.5 to 48.0 μm, more preferably in the range of 33.0 to 46.5 μm, and further preferably in the range of 35.0 to 45.0 μm.

The minor axis and the major axis of the glass fiber in the glass fiber-reinforced resin composition of the present embodiment can be calculated by, for example, first, polishing a cross section of a glass fiber-reinforced resin molded article formed from the glass fiber-reinforced resin composition, then, measuring the length of the major axis and the minor axis of 100 or more glass filaments using an electron microscope, the major axis being the longest side that passes through the substantial center of the glass filament cross section, the minor axis being the side that orthogonally intersects the major axis at the substantial center of the glass filament cross section, and determining the average values thereof.

The glass fiber is usually formed by a plurality of glass filaments bundled, but in the glass fiber-reinforced resin molded article, which is subjected to molding processing, the glass filaments are debundled and present dispersed in a glass filament state in the glass fiber-reinforced resin molded article.

In the glass fiber-reinforced resin composition of the present embodiment, the ratio of the major axis DL to the minor axis DS of the glass fiber (DUDS) is, for example, in the range of 1.2 to 10.0, preferably in the range of 1.8 to 8.0, more preferably in the range of 2.0 to 6.0, further preferably in the range of 2.5 to 5.5, particularly preferably in the range of 3.0 to 5.0, and most preferably in the range of 3.3 to 4.5.

The glass fiber included in the glass fiber-reinforced resin composition of the present embodiment comprises a flat cross-sectional shape, and examples of the flat cross-sectional shape include a long-oval shape (a shape obtained by replacing each shorter side of a rectangle by a semicircle having a diameter corresponding to the shorter side), an ellipse, and a rectangle. A long-oval shape is preferable because of its contribution to enhancement in the fluidity of the glass fiber-reinforced resin composition. The cross section of the glass fiber herein means a transverse cross section perpendicular to the fiber length direction of the glass fiber.

In the glass fiber-reinforced resin composition of the present embodiment, the number average fiber length of the glass fiber may be in the range of 1 to 10000 μm, and is preferably in the range of 250 to 500 μm, more preferably in the range of 300 to 450 μm, and further preferably in the range of 325 to 425 μm.

The number average fiber length of the glass fiber in the glass fiber-reinforced resin composition of the present embodiment can be calculated by the following method. First, the glass fiber-reinforced resin molded article formed from the glass fiber-reinforced resin composition is heated in a muffle furnace at 650° C. for 0.5 to 24 hours to decompose organic matter. Then, the remaining glass fiber is transferred to a glass petri dish, and the glass fiber is dispersed using acetone on the surface of the petri dish. Subsequently, the fiber length of 1000 or more glass fiber filaments dispersed on the petri dish surface is measured using a stereoscopic microscope and averaged to calculate the number average fiber length of the glass fiber.

When the glass fiber content C is less than 65.0% by mass in the glass fiber-reinforced resin composition of the present embodiment, a glass fiber-reinforced resin molded article having excellent strength cannot be obtained. In contrast, when glass fiber content C is more than 85.0% by mass in the glass fiber-reinforced resin molded article of the present invention, processability on producing a glass fiber-reinforced resin molded article will be degraded.

In the glass fiber-reinforced resin composition of the present embodiment, from the viewpoint that excellent strength and processability are simultaneously achieved, the glass fiber content C is preferably in the range of 70.5 to 82.5% by mass, more preferably in the range of 72.0 to 80.0% by mass, and further preferably in the range of 72.5 to 77.5% by mass.

The glass fiber content C in the glass fiber-reinforced resin composition of the present embodiment can be calculated in compliance with JIS K 7052:1999.

In the glass fiber-reinforced resin composition of the present embodiment, the glass composition of glass forming the glass fiber is only required to have a content of $SiO_2S$ in the range of 48 to 70% by mass and a content of $Al_2O_3$ A in the range of 9 to 30% by mass with respect to the total amount of the glass fiber, and is not particularly limited. In the glass composition, the content of $SiO_2S$ with respect to the total amount of the glass fiber is, for example, preferably in the range of 50 to 60% by mass and more preferably in the range of 53 to 60% by mass. The content of $Al_2O_3$ A is, for example, preferably in the range of 10 to 20% by mass and more preferably in the range of 12 to 19% by mass.

In the glass composition, the content of MgO with respect to the total amount of the glass fiber is, for example, in the range of 0 to 15% by mass, preferably in the range of 0 to 12% by mass, more preferably in the range of 1 to 10% by mass, further preferably in the range of 1 to 6% by mass, and particularly preferably in the range of 1 to 4% by mass.

In the glass composition, the content of CaO with respect to the total amount of the glass fiber is, for example, in the range of 0 to 30% by mass, preferably in the range of 2 to 27% by mass, more preferably in the range of 4 to 26% by mass, further preferably in the range of 11 to 25% by mass, and particularly preferably in the range of 16 to 24% by mass.

In the glass composition, the content of $B_2O_3$ with respect to the total amount of the glass fiber is, for example, in the range of 0 to 30% by mass, preferably in the range of 1 to 25% by mass, more preferably in the range of 1 to 10% by mass, further preferably in the range of 2 to 8% by mass, and particularly preferably in the range of 3 to 7% by mass.

In the glass composition, the total content of $Li_2O$, $Na_2O$, $K_2O$, and $Fe_2O_3$ with respect to the total amount of the glass fiber is, for example, 0 to 2% by mass.

In the glass composition, the total content of $TiO_2$ and $F_2$ with respect to the total amount of the glass fiber is, for example, in the range of 0 to 5% by mass and preferably in the range of 1 to 2% by mass.

Regarding measurement of the content of each component described above in the glass fiber included in the glass fiber-reinforced resin composition of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch (prepared by mixing glass raw material) or glass fiber (when organic matter adheres to the surface of the glass fiber, or when glass fiber is mainly included as a reinforcing material in organic matter (resin), the glass fiber is used after the organic matter is removed by, for example, heating for about 0.5 to 24 hours in a muffle furnace at 300 to 650° C.) is placed in a platinum crucible and melted with stirring while being held at a temperature of 1600° C. for 6 hours in an electric furnace to obtain a homogeneous molten glass. Next, the obtained molten glass is poured onto a carbon plate to produce a glass cullet, and then pulverized into powder. Regarding Li as a light element, glass powder is thermally decomposed with an acid and then quantitatively analyzed using an ICP emission spectroscopic analyzer. Regarding other elements, glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component can be determined from these numerical values.

The glass fiber comprising the above glass composition is produced as follows. First, a glass raw material (glass batch) prepared to have the above composition, based on the content of components included in ores to be the glass raw material and each component and the amount of each component volatilized in the melting process, is supplied to a melting furnace and melted at a temperature in the range of 1450 to 1550° C., for example. Then, the melted glass batch (melted glass) is drawn from 1 to 30000 nozzle tips of a bushing controlled at a predetermined temperature and rapidly cooled to form glass filaments. Subsequently, the glass filaments formed are applied with a sizing agent or binder using an applicator as an application apparatus. While 1 to 30000 of the glass filaments are bundled using a bundling shoe, the glass filaments are wound on a tube at a high speed using a winding apparatus to obtain glass fiber. Allowing the nozzle tip to have a non-circular shape and to have a protrusion or a notch for rapidly cooling the molten glass and controlling the temperature condition can provide glass filaments having a flat cross-sectional shape. Adjusting the diameter of the nozzle tip, winding speed, temperature conditions, and the like can adjust the minor axis DS (μm) and major axis DL (μm) of the glass fiber. For example, accelerating the winding speed can make the minor axis DS and major axis DL smaller, and reducing the winding speed can make the minor axis DS and major axis DL larger.

In the glass fiber-reinforced resin composition of the present embodiment, the glass fiber may be coated with an organic matter on the surface thereof for the purposes such as improvement of adhesiveness between glass fiber and a resin, and improvement of uniform dispersibility of glass fiber in a mixture of glass fiber and a resin or inorganic material. Examples of such an organic matter can include urethane resins, epoxy resins, vinyl acetate resins, acrylic resins, modified polypropylene (particularly carboxylic acid-modified polypropylene), and a copolymer of (poly) carboxylic acid (particularly maleic acid) and an unsaturated monomer.

In the glass fiber-reinforced resin composition of the present embodiment, the glass fiber may be coated with the resin composition including a silane coupling agent, a lubricant, a surfactant, and the like in addition to these resins. Such a resin composition covers the glass fiber at a rate of 0.1 to 2.0% by mass based on the mass of the glass fiber in a state where it is not coated with the resin composition. The glass fiber can be coated with an organic matter by applying the sizing agent or the binder containing the resin solution or the resin composition solution to the glass fiber using a known method such as a roller applicator, for example, in the manufacturing process of the glass fiber and then drying the glass fiber to which the resin solution or the resin composition solution is applied.

Examples of the silane coupling agent can include aminosilanes (such as γ-aminopropyltriethoxysilane, N-β-(aminoethyff-γ-aminopropyltrimethoxysilane, N-β-(aminoethyff-N'-β-(aminoethyl)-γ-aminopropyltrimethoxysilane, and γ-anilinopropyltrimethoxysilane), chlorosilanes (such as γ-chloropropyltrimethoxysilane), epoxysilanes (such as γ-glycidoxypropyltrimethoxysilane and β-(3,4-epoxycyclohexyffethyltrimethoxysilane), mercaptosilanes (such as γ-mercaptotrimethoxysilane), vinylsilanes (such as vinyltrimethoxysilane and N-β-(N-vinylbenzylaminoethyff-γ-aminopropyltrimethoxysilane), (meth)acrylsilanes (such as γ-methacryloxypropyltrimethoxysilane), and cationic silanes (such as N-(vinylbenzyl)-2-aminoethyl-3-aminopropyltrimethoxysilane hydrochloride and N-phenyl-3-aminopropyltrimethoxysilane hydrochloride). As the silane coupling agent, these compounds can be used singly or in combination of two or more.

Examples of the lubricant can include modified silicone oil, animal oils (such as beef tallow) and hydrogenated product thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (e.g., dehydrated condensates of polyethylenepolyamines such as diethylenetriamine, triethylenetetramine, and tetraethylenepentamine and fatty acids such as lauric acid, myristic acid, palmitic acid, and stearic acid), and quaternary ammonium salts (such as alkyltrimethylammonium salts such as lauryltrimethylammonium chloride). As the lubricant, these can be used singly or in combinations of two or more.

Examples of the surfactant can include nonionic surfactants, cationic surfactants, anionic surfactants, and amphoteric surfactants. As the surfactant, these compounds can be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

The glass fiber-reinforced resin composition of the present embodiment includes, in addition to the above glass fiber, a thermoplastic resin or a thermosetting resin, and additives other than glass fiber. In the glass fiber-reinforced resin composition of the present embodiment, the content of the thermoplastic resin or the thermosetting resin is, for example, in the range of 20.0% by mass or more and less than 50.0% by mass with respect to the total amount of the glass fiber-reinforced resin composition. In the glass fiber-reinforced resin composition of the present embodiment, the content of the additives other than the glass fiber is, for example, in the range of 0 to 25.0% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryletherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene can include high density polyethylene (HDPE), medium density polyethylene, low density polyethylene (LDPE), linear low density polyethylene (LLDPE), and ultra-high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene having a syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XDS0), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 61), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 41), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14), or copolymers obtained by combining two or more of the components, and mixtures thereof.

Examples of the polyacetal can include a homopolymer with oxymethylene units as the main repeating unit, and a copolymer mainly composed of oxymethylene units and containing oxyalkylene units having 2 to 8 adjacent carbon atoms in the main chain.

Examples of the polyethylene terephthalate can include polymers obtained by polycondensation of terephthalic acid or a derivative thereof with ethylene glycol.

Examples of the polybutylene terephthalate can include polymers obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, crosslinked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly (2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; a polymer alloy of poly(2,6-dimethyl-1,4-phenylene)ether and styrene/butadiene/acrylonitrile copolymer; one obtained by introducing a functional group such as an amino group, an epoxy group, a carboxy group, a styryl group, or the like at the polymer chain end of the polyphenylene ether, and one obtained by introducing a functional group such as an amine group, an epoxy group, a carboxy group, a styryl group, a methacryl group, or the like at the polymer chain side chain of the polyphenylene ether.

Examples of the polyaryletherketone can include polyetherketone (PEK), polyetheretherketone (PEEK), polyetherketoneketone (PEKK), and polyetheretherketoneketone (PEEKK).

Examples of the liquid crystal polymer (LCP) can include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, and aliphatic dicarbonyl units.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid, which is a homopolymer of L-form, poly-D-lactic acid, which is a homopolymer of D-form, or a stereocomplex polylactic acid which is a mixture thereof.

Examples of the cellulose resin can include methylcellulose, ethylcellulose, hydroxycellulose, hydroxymethylcellulose, hydroxyethylcellulose, hydroxyethyl methylcellulose, hydroxypropyl methylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicon (SI) resins, furan (FR) resins, benzoguanamine (BR) resins, alkyd resins, xylene resins, bismaleide triazine (BT) resins, and diallyl phthalate resin (PDAP).

Specific examples of the unsaturated polyester can include resins obtained by esterification reaction of aliphatic unsaturated dicarboxylic acid and aliphatic diol.

Examples of the vinyl ester resin can include bis vinyl ester resins and novolac vinyl ester resins.

Examples of the epoxy resin can include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexadiene bisphenol epoxy resins), phenol novolac epoxy resins, cresol novolac epoxy resins, tetraphenol group ethane novolac epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbomene epoxy resins, adamantane epoxy resins, and fluorene epoxy resins.

Examples of the melamine resin can include a polymer formed by polycondensation of melamine (2,4,6-triamino-1,3,5-triazine) and formaldehyde.

Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and can include one of these or combinations of two or more.

Examples of the urea resin can include a resin obtained by condensation of urea and formaldehyde.

The above thermoplastic resin or the above thermosetting resin may be used singly or in combinations of two or more.

The resin used in the glass fiber-reinforced resin composition of the present embodiment is preferably a thermoplastic resin, more preferably a thermoplastic resin for injection molding, further preferably a resin selected from the group consisting of polyamide resins, polybutylene terephthalate resins, polycarbonate resins, polyarylene sulfide resins, polyaryl ketone resins, and liquid crystal polymer (LCP), and particularly preferably a polyamide resin, because efficient production of a large glass fiber-reinforced resin molded article is enabled.

Examples of the above additives other than the glass fiber can include reinforcing fiber other than glass fiber (e.g., carbon fiber and metal fiber), a filler other than glass fiber (e.g., glass powder, talc, and mica), a flame retardant, an UV absorber, a heat stabilizer, an antioxidant, an antistatic agent, a fluidity improver, an anti-blocking agent, a lubricant, a nucleating agent, an antibacterial agent, and pigment.

The glass fiber-reinforced resin molded article of the present embodiment can be obtained by molding a mixture composed of the above glass fiber reinforced resin composition, and the above additives other than the glass fiber by a molding method appropriately selected, in accordance with the properties of the resin and additives and the application of the glass fiber-reinforced resin molded article, from known molding methods such as injection molding method, injection compression molding method, two-color molding method, hollow molding method, foam molding method (including supercritical fluid foam molding method), insert molding method, in-mold coating molding method, extrusion molding method, sheet molding method, thermal molding method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

The glass fiber-reinforced resin molded article of the present embodiment is preferably a glass fiber-reinforced resin injection molded article obtained by an injection molding method. The injection molding method, which includes a more excellent molding cycle than that of other molding methods, is suitable for efficient production of large glass fiber-reinforced resin molded articles.

In particular, an injection molding method using thermoplastic resin pellets containing the glass fiber-reinforced resin composition of the present embodiment is preferably employed. In this case, as glass fiber in the glass fiber-reinforced resin composition of the present embodiment to be included in the thermoplastic resin pellets, there can be employed chopped strands obtained by cutting glass fiber having the number of glass filaments constituting the glass fiber (number bundled) (also referred to as a glass fiber bundle or glass strand) of preferably 1 to 20000, more preferably 50 to 10000, and further preferably 1000 to 8000 into a length of preferably 1.0 to 30.0 mm, more preferably 2.0 to 15.0 mm, and further preferably 2.3 to 7.8 mm, or cut fiber obtained by pulverizing the glass fiber so as to have a length of preferably 0.001 to 0.900 mm, more preferably 0.010 to 0.700 mm, and further preferably 0.020 to 0.500 mm by a known method such as a ball mill or Henschel mixer. Examples of the form of the glass fiber include rovings, in which the number of glass filaments constituting the glass fiber is 10 to 30000 and which are obtained without cutting, in addition to chopped strands and cut fiber. A roving comprises, for example, a weight of 20 to 10000 tex (g/km).

A method for producing the thermoplastic resin pellets containing the glass fiber-reinforced resin composition of the present embodiment is not particularly limited. For example, the pellets can be produced by melt-kneading chopped strands and a thermoplastic resin as described above under known kneading conditions corresponding to the thermoplastic resin used using a twin-screw kneader or the like and extrusion-molding the kneaded product. Then, a glass fiber-reinforced resin molded article can be obtained by conducting injection molding using these thermoplastic resin pellets under known injection molding conditions corresponding to the thermoplastic resin used with an injection molding machine.

The number average fiber length (μm) of the glass fiber included in the glass fiber-reinforced resin molded article can be adjusted by the length of the chopped strands to be included in the thermoplastic resin pellets, the kneading condition in the period from pellet formation to injection molding, and the injection molding conditions. For example, the number average fiber length (μm) of the glass fiber included in the glass fiber-reinforced resin molded article can be made longer by increasing the length of chopped strands to be loaded in a twin-screw kneader within the range of 1.0 to 100.0 mm and can be made shorter by shortening the length of chopped strands. The number average fiber length (μm) of the glass fiber included in the glass fiber-reinforced resin molded article can be made longer by lowering the screw rotation speed during twin-screw kneading and can be made shorter by elevating the screw rotation speed during twin-screw kneading, within the range of 10 to 1000 rpm, in the production process of the thermoplastic resin pellets.

Examples of applications of the glass fiber-reinforced resin molded article of the present embodiment can include, but are not limited to, metal substitute materials for automobiles. The glass fiber-reinforced resin molded article of the present embodiment can be used in, for example, vehicle exterior members (such as bumper, fender, bonnet, air dam, wheel cover, and door mirror stay), vehicle interior members (such as door trim, ceiling materials, and combination switch), vehicle engine members (such as cylinder head cover, oil pan, engine cover, intake manifold, intake air duct, air pipe, cooling fan, chain guide, tensioner, orifice for engine mount, impeller, air flow meter, ignition coil cover, actuator case, quick connector, and exhaust manifold), vehicle electrical components, vehicle mechanism components (pedal module, shift lever base, pulley, seal ring, gear, bearing), vehicle muffler components (such as silencers), electronic device housing, other electronic components (connectors, sockets, LEDs, and sealed molded articles), high-pressure tank, and the like.

Examples and Comparative Examples of the present invention will be shown.

EXAMPLES

Examples 1 to 4 and Comparative Examples 1 to 5

First, glass chopped strands comprising a glass composition either of the composition A (Examples 1 to 4 and Comparative Examples 1 to 3) or the composition B (Comparative Examples 4 to 5) shown in Table 1 and comprising a length of 3 mm, and a polyamide resin PA6 (manufactured by Ube Industries, Ltd., trade name: UBE Nylon 1015B) were kneaded in a twin-screw kneader (manufactured by Toshiba Machine Co., Ltd., trade name TEM-26SS) at screw rotation speed of 100 rpm to thereby produce thermoplastic resin pellets of the glass fiber-reinforced resin compositions of Examples 1 to 4 and Comparative Examples 1 to 5.

TABLE 1

| | Composition A (Examples 1 to 4 and Comparative Examples 1 to 3) | Composition B (Comparative Examples 4 to 5) |
|---|---|---|
| $SiO_2$ (wt %) | 54 | 65 |
| $Al_2O_3$ (wt %) | 14 | 25 |
| MgO (wt %) | 1 | 10 |
| CaO (wt %) | 23 | 0 |
| $B_2O_3$ (wt %) | 6 | 0 |
| $Li_2O + Na_2O + K_2O + Fe_2O_3$ (wt %) | 1 | 0 |
| $TiO_2 + F_2$(wt %) | 1 | 0 |

In the glass fiber in the glass fiber-reinforced resin composition according to Examples 1 to 4, the content of $SiO_2$S with respect to the total amount of the glass fiber, the content of $Al_2O_3$ A with respect to the total amount of the glass fiber, the cross-sectional shape, the minor axis DS and the major axis DL of the glass fiber, the glass fiber content C of the glass fiber-reinforced resin composition, and the value of $(100\times(A^2/S)\times(C/100)^8)/(DS^{3/4}\times DL^{1/4})$ are shown in Table 2. In the glass fiber in the glass fiber-reinforced resin composition according to Comparative Examples 1 to 5, the content of $SiO_2$S with respect to the total amount of the glass fiber, the content of $Al_2O_3$ A with respect to the total amount of the glass fiber, the cross-sectional shape, the minor axis DS, and the major axis DL of the glass fiber, the glass fiber content C of the glass fiber-reinforced resin composition, and the value of $(100\times(A^2/S)\times(C/100)^8)/(DS^{3/4}\times DL^{1/4})$ are shown in Table 3.

Then, the thermoplastic resin pellets obtained were used to conduct injection molding in an injection molding apparatus (manufactured by Nissei Plastic Industrial Co. Ltd., trade name: NEX80) at a mold temperature of 90° C. and an injection temperature of 270° C. to thereby produce A-type dumbbell test pieces (thickness: 4 mm) in compliance with JIS K 7165:2008. The test pieces were used as test pieces for bending strength and Charpy impact strength measurement. Additionally, the thermoplastic resin pellets obtained were used to conduct injection molding in an injection molding apparatus (manufactured by Nissei Plastic Industrial Co. Ltd., trade name: NEX80) to thereby produce a method A, class Ill test piece in compliance with JIS K 7017:1999 for use as a test piece for flexural modulus measurement.

Then, the test pieces each were used to measure the bending strength, flexural modulus, and Charpy impact strength according to the methods described above. The results are shown in Tables 2 and 3.

The processability in the injection molding was evaluated based on the following A to D. The results are shown in Tables 2 and 3.

A: Can be injection-molded without problem.

B: Can be injection-molded without problem, but a few bridges are present, or the injection pressure is relatively high.

C: A bridge is generated on injection molding, and workability is degraded. Moreover, the injection pressure is high, causing a major damage on the mold.

D: Cannot be injection-molded.

TABLE 2

| | Example 1 | Example 2 | Example 3 | Example 4 |
|---|---|---|---|---|
| $SiO_2$ content S (wt %) | 54 | 54 | 54 | 54 |
| $Al_2O_3$ content A (wt %) | 14 | 14 | 14 | 14 |
| Cross-sectional shape | Long-oval | Long-oval | Long-oval | Long-oval |
| Minor axis DS (μm) | 11.0 | 9.0 | 11.0 | 9.0 |
| Major axis DL (μm) | 44.0 | 36.0 | 44.0 | 36.0 |
| Glass fiber content C (wt %) | 75.0 | 75.0 | 80.0 | 80.0 |
| $(100 \times (A^2/S) \times (C/100)^8)/(DS^{3/4} \times DL^{1/4})$ | 2.34 | 2.85 | 3.91 | 4.78 |
| Number average fiber length of glass fiber in glass fiber-reinforced resin molded article (μm) | 400 | 350 | 380 | 330 |
| Bending strength (MPa) | 350 | 365 | 330 | 350 |
| Flexural modulus (GPa) | 26 | 26 | 28 | 28 |
| Charpy impact strength (kJ/m$^2$) | 28 | 27 | 18 | 17 |
| Processability | A | A | A | B |

TABLE 3

| | Comparative Example 1 | Comparative Example 2 | Comparative Example 3 | Comparative Example 4 | Comparative Example 5 |
|---|---|---|---|---|---|
| $SiO_2$ content S (wt %) | 54 | 54 | 54 | 65 | 65 |
| $Al_2O_3$ content A (wt %) | 14 | 14 | 14 | 25 | 25 |
| Cross-sectional shape | Long-oval | Long-oval | Circle | Circle | Circle |
| Minor axis DS (μm) | 7.0 | 7.0 | 11.0 | 11.0 | 7.0 |
| Major axis DL (μm) | 28.0 | 28.0 | 11.0 | 11.0 | 7.0 |
| Glass fiber content C (wt %) | 80.0 | 70.0 | 70.0 | 72.0 | 50.0 |
| $(100 \times (A^2/S) \times (C/100)^8)/(DS^{3/4} \times DL^{1/4})$ | 6.15 | 2.11 | 1.90 | 6.31 | 0.54 |
| Number average fiber length of glass fiber in glass fiber-reinforced resin molded article (μm) | — | 300 | 210 | 230 | 195 |
| Bending strength (MPa) | — | 400 | 370 | 370 | 390 |
| Flexural modulus (GPa) | — | 24 | 24 | 26 | 16.5 |
| Charpy impact strength ($kJ/m^2$) | — | 35 | 20 | 20 | 22 |
| Processability | D | B | B | C | B |

As clearly seen from Table 2, according to the glass fiber-reinforced resin compositions of Examples 1 to 4, in which, in the glass fiber included in the glass fiber-reinforced resin composition, the content of $SiO_2S$ with respect to the total amount of the glass fiber is 54% by mass and the content of $Al_2O_3$ A with respect to the total amount of the glass fiber is 14% by mass, the glass fiber comprises a flat cross-sectional shape which is a long-oval shape having a minor axis DS in the range of 9 to 11.0 μm and a major axis DL in the range of 36.0 to 44.0 μm, the glass fiber content C in the glass fiber-reinforced resin composition is in a range of 75.0 to 80.0% by mass, and the value of $(100\times(A^2/S)\times(C/100)^8)/(DS^{3/4}\times DL^{1/4})$ is in the range of 2.34 to 4.78, the glass fiber-reinforced resin molded articles obtained by the injection molding each have a bending strength in the range of 330 to 365 MPa, a flexural modulus in the range of 26 to 28 GPa, the glass fiber-reinforced resin compositions of Examples 1 to 4 each have excellent strength and an excellent modulus when processed into a glass fiber-reinforced resin molded article, each have a processability evaluation of A or B, and each have excellent processability on producing a glass fiber-reinforced resin molded article.

In contrast, in the glass fiber included in the glass fiber-reinforced resin composition, as clearly seen from Table 3, according to the glass fiber-reinforced resin composition of Comparative Example 1, in which, the content of $SiO_2S$ with respect to the total amount of the glass fiber is 54% by mass and the content of $Al_2O_3$ A with respect to the total amount of the glass fiber is 14% by mass, the glass fiber comprises a flat cross-sectional shape which is a long-oval shape having a minor axis DS of 7.0 μm and a major axis DL of 28.00 μm, the glass fiber content C in the glass fiber-reinforced resin composition is 80.0% by mass, and the value of $(100\times(A^2/S)\times(C/100)^8)/(DS^{3/4}\times DL^{1/4})$ is 6.15, the processability is evaluated as D, no glass fiber-reinforced resin molded article can be produced therefrom, and the processability on producing a glass fiber-reinforced resin molded article is inferior.

Also as clearly seen from Table 3, according to the glass fiber-reinforced resin composition of Comparative Example 2, in which, in the glass fiber included in the glass fiber-reinforced resin composition, the content of $SiO_2S$ with respect to the total amount of the glass fiber is 54% by mass and the content of $Al_2O_3$ A with respect to the total amount of the glass fiber is 14% by mass, the glass fiber comprises a flat cross-sectional shape which is a long-oval shape having a minor axis DS of 7.0 μm and a major axis DL of 28.00 μm, the glass fiber content C in the glass fiber-reinforced resin composition is 70.0% by mass, and the value of $(100\times(A^2/S)\times(C/100)^8)/(DS^{3/4}\times DL^{1/4})$ is 2.11, the flexural modulus of the glass fiber-reinforced resin molded article obtained by the injection molding is 24 GPa, and a sufficient flexural modulus cannot be obtained in the glass fiber-reinforced resin molded article.

Also as clearly seen from Table 3, according to the glass fiber-reinforced resin composition of Comparative Example 3, in which, in the glass fiber included in the glass fiber-reinforced resin composition, the content of $SiO_2S$ with respect to the total amount of the glass fiber is 54% by mass and the content of $Al_2O_3$ A with respect to the total amount of the glass fiber is 14% by mass, and the glass fiber content C in the glass fiber-reinforced resin composition is 70.0% by mass, but the glass fiber comprises a circular cross-sectional shape having a minor axis DS and a major axis DL of 11.0 μm, the value of $(100\times(A^2/S)\times(C/100)^8)/(DS^{3/4}\times DL^{1/4})$ is 1.90, the flexural modulus of the glass fiber-reinforced resin molded article obtained by the injection molding is 24 GPa, and a sufficient flexural modulus cannot be obtained in the glass fiber-reinforced resin molded article.

Also as clearly seen from Table 3, according to the glass fiber-reinforced resin composition of Comparative Example 4, in which, in the glass fiber included in the glass fiber-reinforced resin composition, the content of $SiO_2S$ with respect to the total amount of the glass fiber is 65% by mass and the content of $Al_2O_3$ A with respect to the total amount of the glass fiber is 25% by mass, and the glass fiber content C in the glass fiber-reinforced resin composition is 72.0% by mass, but the glass fiber comprises a circular cross-sectional shape having a minor axis DS and a major axis DL of 11.0 μm, the value of $(100\times(A^2/S)\times(C/100)^8)/(DS^{3/4}\times DL^{1/4})$ is 6.31, the processability is evaluated as C, and the processability on producing a glass fiber-reinforced resin molded article is inferior.

Also as clearly seen from Table 3, according to the glass fiber-reinforced resin composition of Comparative Example 5, in which, in the glass fiber included in the glass fiber-reinforced resin composition, the content of $SiO_2S$ with respect to the total amount of the glass fiber is 65% by mass and the content of $Al_2O_3$ A with respect to the total amount of the glass fiber is 25% by mass, but the glass fiber content C in the glass fiber-reinforced resin composition is 50.0% by mass, and the glass fiber comprises a circular cross-sectional shape having a minor axis DS and a major axis DL of 7.0 μm, the value of $(100\times(A^2/S)\times(C/100)^8)/(DS^{3/4}\times DL^{1/4})$ is 0.54, the flexural modulus of the glass fiber-reinforced resin molded article obtained by the injection molding is 16.5 GPa, and a sufficient flexural modulus cannot be obtained in the glass fiber-reinforced resin molded article.

The invention claimed is:

1. A glass fiber-reinforced resin composition, wherein in glass fiber included in the glass fiber-reinforced resin composition, a content of $SiO_2$S with respect to a total amount of the glass fiber is in a range of 48 to 70% by mass, in the glass fiber included in the glass fiber-reinforced resin composition, a content of $Al_2O_3$ A with respect to the total amount of the glass fiber is in a range of 9 to 30% by mass, number average fiber length of the glass fiber is in the range of 250 to 500 μm, the glass fiber comprises a flat cross-sectional shape having a minor axis DS in a range of 6.0 to 15.0 μm and a major axis DL in a range of 30.5 to 50.0 μm, a glass fiber content C in the glass fiber-reinforced resin composition is in a range of 70.5 to 85.0% by mass, and the S, A, DS, DL, and C satisfy following formula (1):

$$2.24 \leq (100\times(A^2/S)\times(C/100)^8)/(DS^{3/4}\times DL^{1/4}) \leq 5.85. \quad (1)$$

2. The glass fiber-reinforced resin composition according to claim 1, wherein the S is in a range of 50 to 60% by mass, the A is in a range of 10 to 20% by mass, the DS is in a range of 7.5 to 13.0 μm, the DL is in a range of 30.5 to 48.0 μm, and the C is in a range of 70.5 to 82.5% by mass, and the S, A, DS, DL, and C satisfy following formula (2):

$$2.27 \leq (100\times(A^2/S)\times(C/100)^8)/(DS^{3/4}\times DL^{1/4}) \leq 4.30. \quad (2)$$

3. The glass fiber-reinforced resin composition according to claim 2, wherein the S, A, DS, DL, and C satisfy following formula (3):

$$2.29 \leq (100\times(A^2/S)\times(C/100)^8)/(DS^{3/4}\times DL^{1/4}) \leq 3.37. \quad (3)$$

4. The glass fiber-reinforced resin composition according to claim 1, wherein the resin included in the glass fiber-reinforced resin composition is a thermoplastic resin for injection molding selected from a group consisting of polyamide resins, polybutylene terephthalate resins, polycarbonate resins, polyarylene sulfide resins, polyaryl ketone resins, and liquid crystal polymer (LCP).

5. The glass fiber-reinforced resin composition according to claim 4, wherein the resin included in the glass fiber-reinforced resin composition is a polyamide resin.

6. A glass fiber-reinforced resin molded article formed from the glass fiber-reinforced resin composition according to claim 1.

7. The glass fiber-reinforced resin composition according to claim 2, wherein the resin included in the glass fiber-reinforced resin composition is a thermoplastic resin for injection molding selected from a group consisting of polyamide resins, polybutylene terephthalate resins, polycarbonate resins, polyarylene sulfide resins, polyaryl ketone resins, and liquid crystal polymer (LCP).

8. The glass fiber-reinforced resin composition according to claim 3, wherein the resin included in the glass fiber-reinforced resin composition is a thermoplastic resin for injection molding selected from a group consisting of polyamide resins, polybutylene terephthalate resins, polycarbonate resins, polyarylene sulfide resins, polyaryl ketone resins, and liquid crystal polymer (LCP).

9. A glass fiber-reinforced resin molded article formed from the glass fiber-reinforced resin composition according to claim 2.

10. A glass fiber-reinforced resin molded article formed from the glass fiber-reinforced resin composition according to claim 3.

11. A glass fiber-reinforced resin molded article formed from the glass fiber-reinforced resin composition according to claim 4.

12. A glass fiber-reinforced resin molded article formed from the glass fiber-reinforced resin composition according to claim 5.

13. A glass fiber-reinforced resin molded article formed from the glass fiber-reinforced resin composition according to claim 7.

14. A glass fiber-reinforced resin molded article formed from the glass fiber-reinforced resin composition according to claim 8.

* * * * *